United States Patent Office 3,788,983
Patented Jan. 29, 1974

3,788,983
SELECTIVE SEPARATION OF CYANIDE FROM WASTE STREAMS BY ADSORPTION PROCESS
William Fries, Southampton, Pa., assignor to Rohm and Haas Company, Philadelphia, Pa.
No Drawing. Filed Jan. 26, 1972, Ser. No. 221,040
Int. Cl. C02b 1/62; C02c 5/02
U.S. Cl. 210—28                                9 Claims

ABSTRACT OF THE DISCLOSURE

This invention relates to the purification of industrial effluents and waste effluents in general, which contain cyanides. More particularly, the invention relates to the detoxification of such effluents by a treatment with a metallic ion which forms stable anionic complexes of cyanide, and the complete and selective removal of said complexes by an anion exchange resin.

BACKGROUND OF THE INVENTION

There is a widespread problem of cyanide pollution in industrial waste streams, particularly with chemical, steel and electroplating industries. These streams are aqueous and generally contain large quantities of inorganic solids (1000–10,000 p.p.m.); oxidizable organic other than cyanides; and relatively low levels of cyanide (<2000 p.p.m.). However, these cyanide levels are still well above all pollution standards which generally allow 1.0 p.p.m. cyanide or less.

Industry is making major and expensive investments to minimize stream pollution in this area, as governmental authorities adopt and enforce stricter water quality standards. No present methods are known to be able to reduce generally the cyanide levels of such streams to extremely low levels. The classical and most common approach today is to oxidatively destroy the cyanide by the use of alkaline chlorination. However, this method has several limitations because of:

(1) Inability to perform this oxidation upon complexed cyanides already existing in water, or are formed upon making alkaline (in either case, indigenous transition metal ion presence will be the casual factor);

(2) The inherently inefficient use of chemicals because of theoretical considerations running as high as one dollar per pound of cyanide removed, i.e., 5 and ½ equivalents $Cl_2$ required for one equivalent of CN, and 4 equivalents NaOH required for one equivalent of CN;

(3) The general need for even more chemical usage because of the non-selective nature of oxidation (other stream constituents both organic and inorganic must be oxidized also); and (4) The distinct possibility of creating other toxic chemicals such as cyanates and chlorinated hydrocarbons.

The only other commercially acceptable technique presently used is the complete removal of all ions by ion exchange. However, this technique is not generally applicable because of its low capacity. The large salt background in most streams preclude its use—commercially again—because of the large chemical usage for regeneration purposes.

Furthermore, the overall accomplishment is the concentrations of all solids, the percentage of cyanide and the form of the cyanide is identical to the original stream. With streams of high total solids, concentration factors greater than 10 are impossible. The cyanide regenerated from the ion exchange system will still be identical in nature to that originally in the waste stream, and thus still present a disposal problem.

The preparation, isolation and identification of anionic complex metal cyanides have been known for many years. A summary is in the next, "Cyanogen Compounds," by Herbert E. William (1948), E. Arnold and Co., London. The preparation, on laboratory scale, generally involved the addition of stoichemical amounts of metal ion and cyanide to water, with proper conditions for formation, or the addition of excess cyanide.

In all cases, it was found that using excess metal ion caused the complete complexation of all the cyanide present; however, the form of the complex changed to a non-anionic nature.

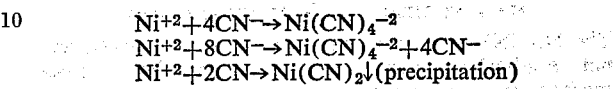

The adsorption of these purified anionic complexes or indigenous anionic complexes from aqueous solution by anion exchange resins, both strongly and weakly basic, have been reported.

Some commercial application of the adsorption of cyanide complexes have been made. The largest application is in the mining industry. Here large excesses of aqueous NaCN are used to extract precious metals, such as gold and silver; and the anionic complexes are selectively adsorbed and thereby concentrated by use of quaternary ion exchange resins such as Amberlite IRA-400 (an anion exchange resin). Special regeneration techniques are used which destroy the anion complex, thereby allowing the release of the cationic free metal from the resin.

One paper suggests an ion exchange method in which the free cyanide is recovered from the waste water in mining process. The method consists of two beds of Amberlite IRA-400 operating in series. The first bed will remove all residual traces of anionic metal complexes. The second bed contains CuCN precipitated within its matrices, and removes free cyanide by the reaction:

The first bed is regenerated with hot dilute $H_2SO_4$, which causes a simple destruction of the metal cyanides to the free metal ion. Regeneration of the second is accomplished with hot dilute $H_2SO_4$ an example follows:

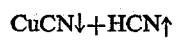

After many cycles the first bed must be treated with $Fe_2(SO_4)_3$ to remove built-up CuCN.

Another reference advocates the addition of $Zn^{+2}$ ion to cyanide waste streams from gold recovery plants for anionic complexation and subsequent adsorption by Amberlite IRA-400 type resins. No recognition is made herein of the criticality of the stoichiometry to provide for ensuring complete complexation of the cyanide with $Zn^{+2}$. It is also stated that the iron cyanides of thiocyanates also present will permanently poison the bed. Regeneration of the $Zn(CN)_4^{-2}$ complex from the resin is easily accomplished with 0.2 N $H_2SO_4$.

A further reference recommends a four-bed ion exchange system for the treatment of cyanide wastes. The first bed is weakly basic (sulfate form) to remove indigenously complexed cyanides; tne second IRA-400 type resin impregnated with CuCn to remove free cyanide; the third bed is a cation exchanger (H+ form); and lastly a strong base resin (OH- form). This system will remove all ions from waste water with each resin bed adsorbing an appropriate constituent.

The extensive prior art has led to no system which will selectively and practically remove cyanide from aqueous streams down to levels satisfactory for present regulations (1.0 p.p.m.). The basic flaws in the art are:

(1) No method has been suggested by which all the cyanide in streams can be complexed with complex metal ions, without elaborate and time consuming analytical control ensuring exact stoichiometry. No known automatic equipment is available to guarantee stoichiometry in a stream which is fluctuating in cyanide content;

(2) Without being able to guarantee complexation of cyanide, all systems designed to remove anionic complexed cyanide will either leak free cyanide if insufficient complexing metal is added, or will cause the precipitation of non-charged complexes if too large a concentration of complexing metal is used as shown in the following equation:

$$Ni^+ + Ni(CN)_4^{-2} \xrightarrow{-2OH^-} Ni(CN)_2\downarrow \text{ (Stable)}$$

The $Ni(CN)_2$ will precipitate, and being uncharged will not be adsorbed by anion exchange resins, thereby passing into the effluent stream.

(3) The system using Amberlite IRA-400 resin, impregnated with CuCN, does not require a stoichemical balance of metal and cyanide. However, its main failure is that leakage of cyanide is high, because the precipitated CuCN occludes the pores of the resin, prohibiting proper penetration into the resin by the waste stream.

(4) In the case of the adsorption of the ferro or ferricyanide complex from waste streams, where accomplished with Amberlite IRA-400, no method of regeneration is known. This is because the complex is too strong for destruction even when regeneration was attempted with hot $H_2SO_4$.

With this present invention, all of these limitations have been overcome. It is an object of this invention to provide a treatment system which is able to selectively and efficiently remove cyanide from effluents of high salt background.

It is another object in cyanide disposal to avoid the use of expensive and non-selective destructive processes, and moreover obtain a lower cyanide level in the effluent than achieved heretofore.

It is another object to provide resin matrices which can effectively sorb cyanide from a large volume of aqueous waste streams in a one column ion-exchange operation.

It is still another object to provide sorption systems for cyanide streams which can be readily and effectively regenerated.

It is another object to provide a separation process which yields a final effluent having substantially no toxic materials, such as cyanate ion.

It is still another object to provide a cyanide removal method which permits the recovery of the cyanide in a concentrated, non-toxic and marketable form.

This present system will accomplish all these objects in such a manner as to easily allow its practical utilization on a commercial basis. This is partially because exact stoichiometry relationship among the reactants will not be required.

THE INVENTION

The essence of this present invention is the use of ferrous ion as the complexing agent for cyanide, with subsequent adsorption employing a weakly basic ion exchange resin.

The advantage of ferrous ion are two-fold:

(1) The ferrous ion incorporates all the cyanide into an anion complex $(Fe(CN)_6^{-4})$. This complex is not subject to further reaction of excess ferrous ion, because it is very stable species. Also, the excess ferrous ion is precipitated quantitatively as ferrous hydroxide at the pH's of complex formation, and is therefore not available for further reaction. All the cyanide remains in solution as the ferrocyanide anion. It has been further discovered that the presence of small quantities of ammonia aid in the formation of the ferrocyanide complex.

(2) The ferrocyanide complex is extermely stable at all pH's of water. Therefore, it is able to be adsorbed by weakly basic resins operating in the acid salt form. No other practical cyanide complex has yet been demonstrated as stable enough for this.

The selectivity of these resins for the ferrocyanide complex is just as high as for the quaternary resins; however, the weakly basic resins may be simply regenerated by ion exchange techniques in which the ferrocyanide is removed as an entity. The complexes adsorbed by quaternary resins must be destroyed within the resin matrix before regeneration can take place.

The overall process consists of adding excess ferrous ion in the form of ferrous sulfate, or ferrous ammonium sulfate (used if no indigenous ammonia is present in the stream) to the waste stream containing cyanide. The pH of the stream is adjusted above 9 to form the ferrocyanide complex.

If fre ammonia needs to be added, then it should be in an amount sufficient to maintain the complete complexation of the cyanide through the adsorption step. This may range as high as 500–1000 p.p.m.

At this point, it is necessary to eliminate the solid phase of the waste stream which consists of indigenous solid matter as well as the excess ferrous ion as ferrous hydroxide. By using one ion exchange bed of a weakly basic resin in the salt form to adsorb the preformed ferrocyanide ion, complete removal of cyanide to less than 1 p.p.m. is achieved. Also, regeneration may be accomplished simply with sodium hydroxide solution (1–10% is recommended), giving a highly concentrated effluent of $Na_4Fe(CN)_6$, which is relatively safer to handle than $CN^-$, non-toxic, and marketable.

The resin and solution pH must be adjusted into the range of 4–7 prior to the adsorption step. The resin pH may be adjusted in two ways. For relatively strongly basic non-quaternary resins (pka >9), a small quantity of a very weakly basic buffer such as $NaHCO_3$ may be passed through the bed to neutralize the small quantities of acid remaining from the conversion. Or for the ordinary weakly basic resins, a small quantity of the resin (approx. 10%) can be left unconverted by the acid step. Upon mixing the resin bed with air, again the small excesses of acid in local areas of the resin will be neutralized. If the adsorption process is not kept above pH 4, the formation of a blue cyanide complex precipitate, $Fe_3(CN)_6$, occurs and it is passed right through the resin bed.

The overall chemistry of the invention is:

(1) Complex formation reaction $$2FeSO_4 + 6NaCN + 2NaOH \xrightarrow{pH>9} Na_4Fe(CN)_6 + Fe(OH)_2 + 2Na_2SO_4$$

(2) Settling of solids
(3) pH adjustment of solution (4–7)
(4) Adsorption of complex $$\text{Resin--N·1/2H}_2SO_4 + Na_4Fe(CN)_6 \xrightarrow{pH=4-7} (\text{Resin--N})_4 \cdot H_4Fe(CN)_6 + 2Na_2SO_4$$

(5) Regeneration of resin $$(\text{Resin--N·H}_4Fe(CN)_6 + 4NaOH \rightarrow 4\text{ Resin--N} + Na_4Fe(CN)_6 + 4H_2O$$

(6) Resin preparation of adsorption step $$\text{Resin--N} + \frac{1}{2}H_2SO_4 \rightarrow \text{Resin--N·}\frac{1}{2}H_2SO_4$$

(7) Rinse with water
(8) pH adjustment of acidified resin

Step (8) may be accomplished by, for example,
(a) Use of small quantity (approx. 10% of resin stoichemistry) of a weak base, or (b) Post mixing of resin bed which has been treated with 90% or less of $H_2SO_4$ required in step (6).

Multiple cycle studies that have demonstrated that streams of up to 2000 p.p.m. cyanide (as free cyanide, or mixtures of free, complexed, and cyanide precursors) have been reduced to levels substantially below 1 p.p.m. cyanide by this process.

The resins recommended for this process are weakly basic in nature, that is with average functionality of pka between 6–10. Their crosslinked polymeric structure may comprise:

(a) A polymerizable ethylenically unsaturated monomer having about 2 to 100 weight percent of at least one poly(vinylbenzene) monomer selected from the group consisting of divinylbenzene, trivinylbenzene, alkyl divinylbenzenes having from 1 to 3 alkyl groups of 1 to 2 carbon atoms substituted in the benzene nucleus and any other bifunctional vinyl moiety; and (b) From 0.1 to 99 percent by weight of one of acrylic acid, methacrylic acid and maleic acid, which are crosslinked with one of the above mentioned polyvinylbenzenes; and (c) From 0.1 to 99 percent epichlorohydrin crosslinked internally; and (d) From 0.1 to 99 percent ethylene dichloride and polyamine condensate in which internal cross-linking is used also.

EXAMPLE I

The cyanide in a waste stream containing 500 p.p.m. $CN^-$ +5000 p.p.m. of $Na_2SO_4$ was adjusted to pH 11.0. Excess $Fe(NH_4)SO_4$ was added to give a $CN^-$/Fe ratio in excess of 6. After allowing the excess iron precipitate to settle for 1 hour, the clear solution was decanted, filtered, adjusted to pH 7.0, and passed through a weakly basic resin at a flow rate of 2 gal./ft.$^3$/min. Resin A is a relatively strong weakly basic resin (pka=9.5).

A capacity of 30 mg. CN/ml. resin was obtained with an average leakage of 0.2 p.p.m. $CN^-$ and 1 p.p.m. Fe. The $Na_2SO_4$ and other dissolved solution passed to the effluent untouched. Regeneration of the resin was accomplished using one normal (1 N) NaOH. Finally, the resin was converted with $H_2SO_4$, rinsed and adjusted in pH to 4 to 7 by passing through a small quantity of 1 N $NaHCO_3$. One hundred percent regeneration of the iron and cyanide in the form of pure $Na_4Fe(CN)_6$ was achieved. A total of 16 complete cycles based upon this process were successfully performed.

EXAMPLE II

A wash stream containing 500 p.p.m. $CN$+5000 p.p.m. $Na_2SO_4$ was adjusted to pH 11.0 with NaOH. Three hundred p.p.m. $Fe^{++}$ in the form $FeSO_4$ and 500 p.p.m. $(NH_4)_2SO_4$ were added. After allowing the excess iron precipitate to settle for 1 hour, the clear solution was decanted, filtered, adjusted in pH to 5.5 and passed through a weakly basic Resin B (sulfate form) at a flow rate of 2 gal./ft.$^3$/min.

A capacity of 8 mg. CN/ml. resin was obtained with an average leakage of 0.5 p.p.m. CN. The other dissolved solids passed to the effluent untouched. Regeneration was accomplished using 1 N NaOH. After rinsing, the resin was treated with 1 normal $H_2SO_4$ equal to 90% of the resins' functional group. This left 10% of the functionality in the basic form. The resin was then agitated under water by air lancing. The resin was then prepared for a second cycle of adsorbing the ferrocyanide influent.

EXAMPLE III

A waste stream from an organic intermediate plant containing 28 p.p.m. CN and approximately 3000 p.p.m. other dissolved solids including 500 p.p.m. $NH_3$, was adjusted to pH 11.0. Three-hundred p.p.m. $Fe^{+2}$ in the form of $FeSO_4$ was added. The clear stream from the settled and decanted solution was passed through a bed of Resin A (sulfate form) at a flow rate of 2 gal./ft.$^3$/min.

A capacity of 28 mg. CN/ml. resin was obtained with an average leakage of 0.2 p.p.m. $CN^-$. All the other constituents passed to the effluent untouched. Regeneration and conversion was accomplished identically to Example 1. The regenerant effluent contained approximately 2% $Na_4Fe(CN)_6$.

EXAMPLE IV

A waste stream from a coking process in steel processing was found to contain 2000 p.p.m. NaCNS and 20 p.p.m. $Na_4Fe(CN)_6$ as well as large concentrations of other salts. This solution was adjusted to pH 7.0 and passed directly over Resin A (sulfate form) at a flow rate of 2 gal./ft.$^3$/min.

Through 200 bed volumes, no detectable cyanide appeared in the effluent while all the other constituents appeared unchanged in the effluent. The one exception was the NaCNS which was adsorbed for 10 bed volumes but successively passed through the Resin A untouched. This system had not reached an obvious end point for cyanide leakage at this point. From previous experiments, approximately 3000 bed volumes of complete cyanide removal would be expected.

EXAMPLE V

The exact same experiment was performed, but with Resin B (sulfate form) as described in Example IV. One hundred and sixty bed volumes were treated with no apparent breakpoint and in detectable leakage.

EXAMPLE VI

A stream containing 500 p.p.m. $Na_4Fe(CN)_6$+5000 p.p.m. $Na_2SO_4$ at pH 5.0 was treated by three resins in parallel. These resins were all converted to the sulfate form to the extent of 80% of their total anion exchange capacity and mixed. All three resins reduced the cyanide level to <1 p.p.m. to the following capacities:

| | Capacity (mg. CN/ml.) |
|---|---|
| Resin B | 21.9 |
| Resin C | 29.2 |
| Resin D | 25.5 |

It has been determined that through the judicious selection of the weakly basic ion exchange resin, and through the utilization of a suitable regeneration system, that all of the adsorbed cyanide can be recovered as the stable $Na_4Fe(CN)_6$. This compound is marketable and has an established value, which not only could pay back all treatment costs, but could allow a small profit for the use of this system.

In the foregoing examples, the chemical nature of the evaluated resins is as follows:

TABLE I

| | |
|---|---|
| Resin A | A weakly basic anion exchange resin made by the copolymerization of methyl acrylate, acrylonitrile and divinylbenzene. This copolymer is aminolyzed with a polymer. This is a relatively strong resin with a pka >9.0. |
| Resin B | A weakly basic anion exchange resin made by the copolymerization of styrene and divinylbenzene, chlormethyllation and amination with dimethylamine. Finally, a portion of the amine functionality is converted to the amine oxide form with $H_2O_2$. (pka < 9). |
| Resin C | A condensation of epi-chlorohydrin and a polyamine. Weakly basic (pka < 9). |
| Resin D | A condensation of ethylene dichloride and a polyamine Weakly basic (pka < 9). |

Cyanides, as the term is employed herein, refer to hydrogen cyanide, any salt of simple cyanides, complexes of cyanides, and any precursor of cyanide such as acetocyanohydrin.

I claim:

1. A process of ecological improvement for selectively removing soluble cyanide present in aqueous streams, which comprises:

(a) contacting the aqueous stream bearing measurable concentrations of cyanide or its precursors with an amount of a water soluble ferrous ion sufficient to accomplish substantially complete complexation of said cyanide to a soluble ferrocyanide anion.

(b) adjusting the stream pH to the range of above 9 which favors cyanide complexing and maintains said cyanide as a soluble complex;

(c) separating any insoluble materials now present;

(d) adjusting the pH of the stream to the 4 to 7 range;
(e) passing the stream containing the soluble ferrocyanide anion through a mass or bed of water insoluble, cross-linked, polymeric, weakly basic anion exchange resin in substantially the acid salt form, having an overall bead size in the range of 2.4 to .04 millimeter.

2. A process according to claim 1 wherein said weakly basic anion exchange resin comprises a copolymer of:
  (a) a polymerizable ethylenically unsaturated molecule having about 2 to 100 weight percent of at least one poly(vinylbenzene) monomer selected from the group consisting of divinylbenzene, trivinylbenzene, alkyl divinylbenzenes having from 1 to 3 alkyl groups of 1 to 2 carbon atoms substituted in the benzene nucleus; and
  (b) from 0.1 to 99 percent by weight of one of acrylic acid, methacrylic acid and maleic acid, which are cross-linked with one of the above mentioned polyvinylbenzene); and
  (c) from 0.1 to 99 percent epichlorohydrin and polyamine condensate, cross-linked internally; and
  (d) from 0.1 to 99 percent ethylene dichloride and polyamine condensate cross-linked internally.

3. The process according to claim 1 wherein among said insoluble materials being separated is included ferrous hydroxide.

4. A process according to claim 1 wherein the exhausted resin bed is regenerated by contacting same with an aqueous basic solution.

5. The process of claim 4 wherein the preferred regenerant solution is sodium hydroxide having a normality in the range of 0.01 to 10.

6. The process according to claim 1 wherein substantially concurrently with the addition of said ferrous ion, there is added free ammonia in an amount sufficient to maintain the complete complexation of the cyanide through the adsorption step.

7. A process to claim 4 in which the ferrocyanide loaded regenerant liquid is recovered for further utilization.

8. The process of claim 4 wherein the regenerated resin is treated with a strong mineral acid to substantially convert same to the acid salt form, followed by a second treatment with (a) mild base to remove the residual excess acid on the resin, or (b) physical agitation of said bed to internally neutralize the excess acid.

9. The process of claim 4 wherein said strong mineral acid is sulfuric acid.

References Cited
UNITED STATES PATENTS

| | | | |
|---|---|---|---|
| 465,600 | 12/1891 | Rowland | 423—367 |
| 1,398,453 | 11/1921 | Washburn | 423—367 |
| 2,839,389 | 6/1958 | Kember et al. | 423—139 X |
| 3,414,510 | 12/1968 | Oberhofer | 210—37 |
| 3,681,210 | 8/1972 | Zievers et al. | 210—37 X |

OTHER REFERENCES

Burstall, F. H., et al.: "Ion Exchange Process For Recovery of Gold From Cyanide Solution," Ind. & Eng. Chem. 45:1648 (1953).

Evans, V.: "Effluents in the Metal Finishing Industries," Metal Industry, Finishing Supplement, September 10, 1954, pp. 211-214.

SAMIH N. ZAHARNA, Primary Examiner

T. G. WYSE, Assistant Examiner

U.S. Cl. X.R.

210—37, 59; 423—367

UNITED STATES PATENT OFFICE
CERTIFICATE OF CORRECTION

Patent No. 3,788,983                  Dated January 29, 1974

Inventor(s)  William Fries

It is certified that error appears in the above-identified patent and that said Letters Patent are hereby corrected as shown below:

In the specification make the following changes:
    Col. 1, line 43, "casual" should read --causal--
    " 72, "next" should read --text--
    Col. 2, line 8, after "complex" insert --was--
    " 62, "CuCn" should be --CuCN--
    Col. 3, line 71, "extermely" should be --extremely--
    Col. 4, line 14, "fre" should be --free--
    " 46, "$_2$NaOH" should be 2NaOH
    " 56, "(Resin—N·" should read --(Resin—N)·--

In the claims, please make the following change:
    Col. 7, line 20, "vinylbenzene)" should read --(vinylbenzene)--

Col. 4, line 66, "stoichemistry" should read -- stoichiometry --    Col. 6, line 22, "in" should read -- no -- .

Signed and sealed this 16th day of July 1974.

(SEAL)
Attest:

McCOY M. GIBSON, JR.
Attesting Officer

C. MARSHALL DANN
Commissioner of Patents